United States Patent
Iwabuchi et al.

(10) Patent No.: US 8,885,025 B2
(45) Date of Patent: Nov. 11, 2014

(54) PROCESSOR

(75) Inventors: Hiroshi Iwabuchi, Yokohama (JP); Kazuaki Ito, Yokohama (JP); Hiroaki Kusaba, Yokohama (JP); Hiroto Ito, Yokohama (JP); Masafumi Oikawa, Yokohama (JP); Masaaki Takagi, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 505 days.

(21) Appl. No.: 13/033,164

(22) Filed: Feb. 23, 2011

(65) Prior Publication Data
US 2011/0316981 A1 Dec. 29, 2011

(30) Foreign Application Priority Data

Jun. 29, 2010 (JP) ................. 2010-147766

(51) Int. Cl.
H04N 13/02 (2006.01)
G06T 7/00 (2006.01)

(52) U.S. Cl.
CPC ............ H04N 13/026 (2013.01); G06T 7/0069 (2013.01)
USPC .................. 348/49; 348/43; 348/44; 348/46; 348/47; 375/240.12; 382/154; 382/173; 396/104

(58) Field of Classification Search
CPC .......... H04N 13/0239; H04N 5/23212; H04N 13/026; H04N 13/0296; H04N 13/0022; H04N 5/2351; H04N 13/0025; H04N 13/0029; H04N 13/021; H04N 13/0271; G03B 35/10; G06T 2207/10012
USPC .................. 348/46, 94; 375/240.12; 382/173
IPC ....................................... H04N 13/02
See application file for complete search history.

(56) References Cited

U.S. PATENT DOCUMENTS

| 2001/0052935 | A1 | 12/2001 | Yano |
| 2004/0090523 | A1* | 5/2004 | Kondo et al. ................... 348/46 |
| 2007/0097207 | A1 | 5/2007 | Toriumi |
| 2008/0031327 | A1* | 2/2008 | Wang et al. .............. 375/240.12 |
| 2008/0123960 | A1* | 5/2008 | Kim et al. ..................... 382/173 |
| 2010/0128163 | A1 | 5/2010 | Nagasaka et al. |

FOREIGN PATENT DOCUMENTS

| JP | 05-007373 A | 1/1993 |
| JP | 07-182533 A | 7/1995 |
| JP | 09-116932 A | 5/1997 |
| JP | 11-146423 A | 5/1999 |
| JP | 11-239364 A | 8/1999 |
| JP | 2001-346226 A | 12/2001 |
| JP | 2002-125246 A | 4/2002 |
| JP | 2007-110360 A | 4/2007 |
| JP | 2007-129436 A | 5/2007 |
| JP | 2010-128018 A | 6/2010 |

OTHER PUBLICATIONS

Japanese Office Action; Japanese Patent Applicaiton No. 2010-147766 dated Oct. 29, 2013.

* cited by examiner

Primary Examiner — Jay Patel
Assistant Examiner — Neil Mikeska
(74) Attorney, Agent, or Firm — Arent Fox LLP

(57) ABSTRACT

A processor includes: an imaging control unit which causes an imaging unit for capturing an image with changing a focused object distance, to change the focused object distance with a first change width in the case of a first focused object distance, and to change the focused object distance with a second change width that is smaller than the first change width in the case of a second focused object distance that is shorter than the first focused object distance; and an image processing unit which extracts focused object image data from captured image data for each of the focused object distances, and generates image data by shifting the extracted object image data by parallax amounts corresponding to the respective focused object distances, and by synthesizing the extracted object image data.

4 Claims, 17 Drawing Sheets

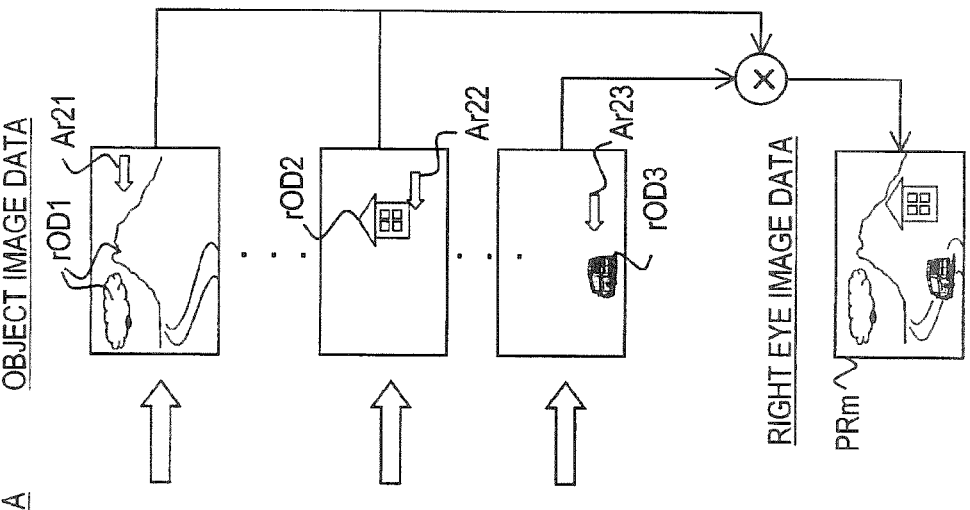
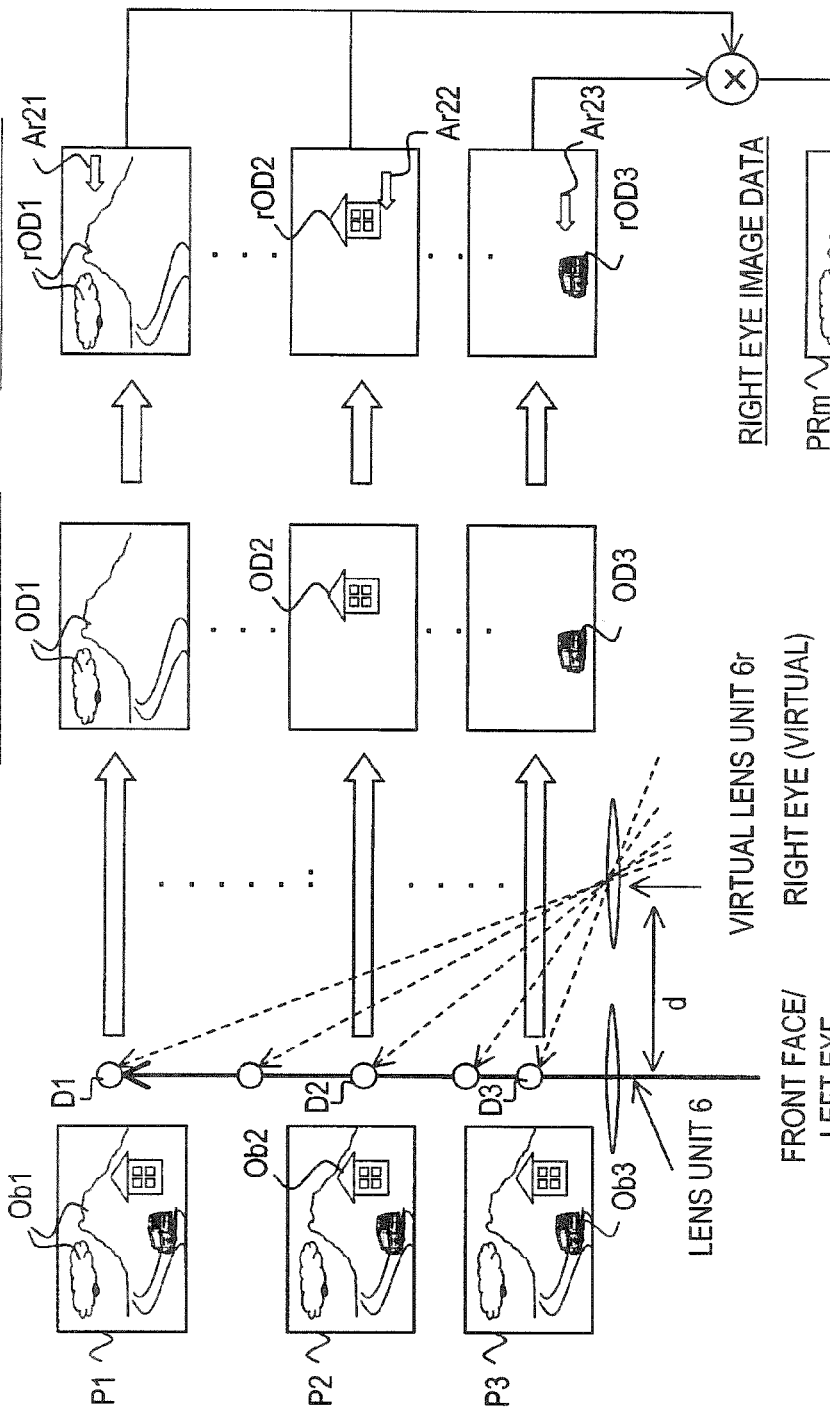

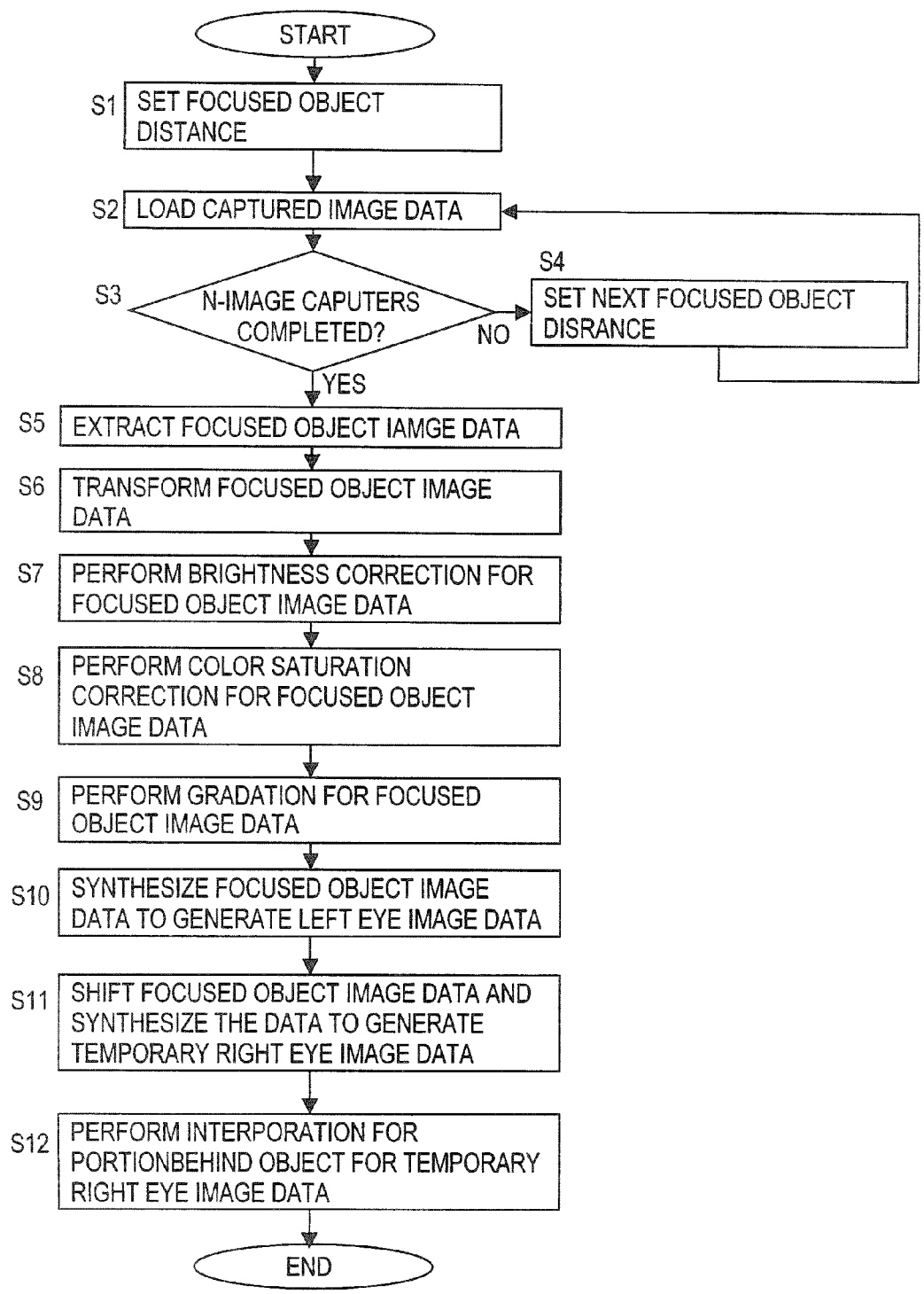

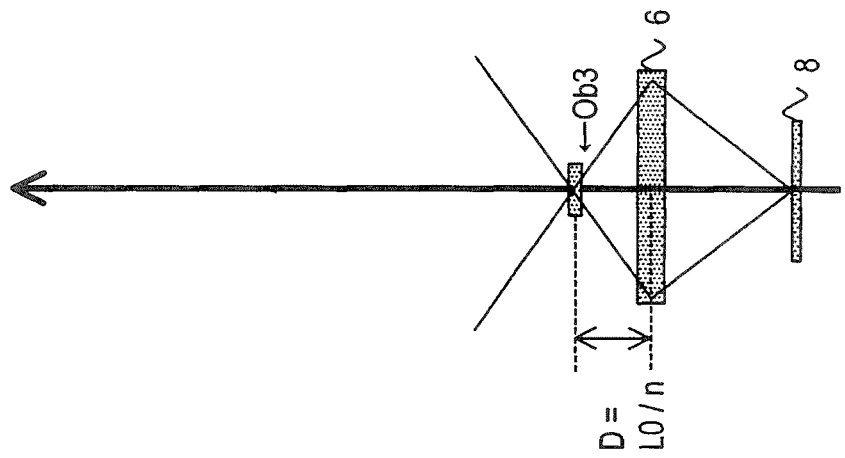
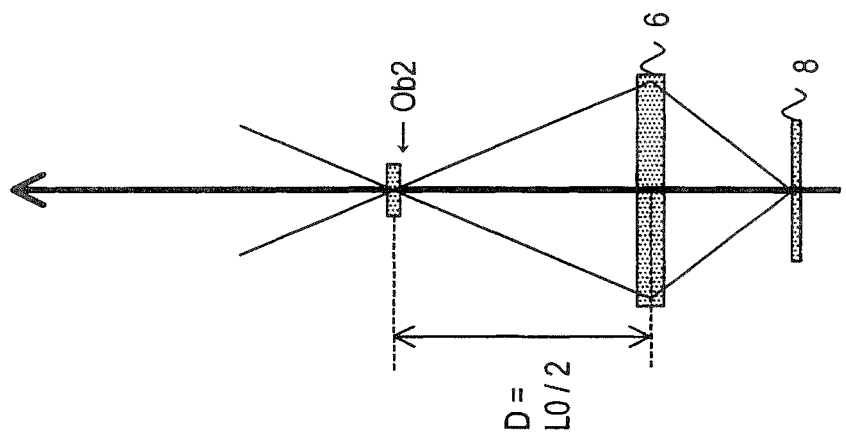
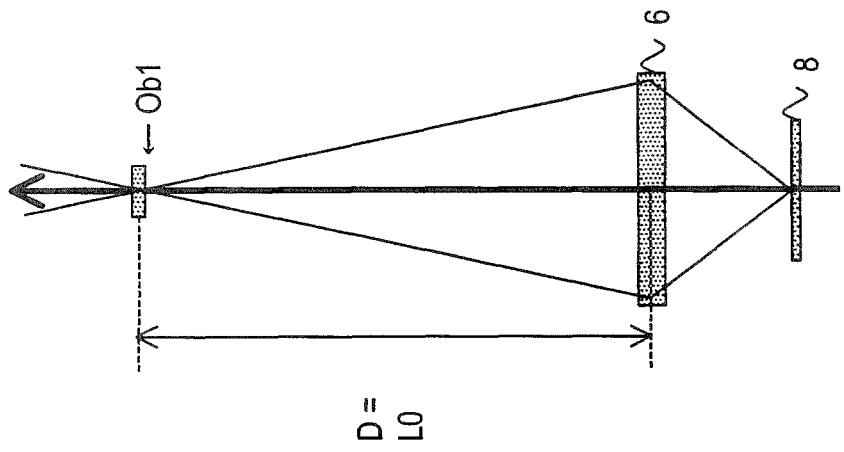

PROCESSOR

CROSS-REFERENCE TO RELATED APPLICATION

This application is based upon and claims the benefit of priority of the prior Japanese Patent Application No. 2010-147766, filed on Jun. 29, 2010, the entire contents of which are incorporated herein by reference.

FIELD

The embodiments discussed herein relate to a processor which generates a parallax image for a three-dimensional image.

BACKGROUND

A method for generating a three-dimensional image using parallax images, which includes of an image for a left eye (hereafter "left eye image") and an image for a right eye (hereafter "right eye image"), which have parallax from each other, is known. Japanese Patent Application Laid-Open Nos. H5-7373, H9-116932, 2002-125246 and 2007-129436 disclose technologies related to parallax images.

As one parallax image generation method, a method for independently capturing a left eye image and a right eye image of a same object using two systems of image capturing units having parallax, such as two digital still cameras or double lenses of a digital still camera, which are set for generating parallax, has been proposed. Another method that has been proposed is generating a parallax image using image processing from an image captured by a single lens digital still camera. According to this method, a left eye image is captured by a single lens image capturing unit first, then the object image extracted from the left eye image is shifted by the amount of parallax, thereby a right eye image is generated.

A method for using a single lens image capturing unit may be implemented using a simple and compact configuration, but the following procedures are required. For example, in order to determine parallax for each of a plurality of objects when capturing the plurality of objects of which distances from the image pickup unit are different, the distance information of each object is required. Therefore instead of disposing a distance measuring unit, a plurality of images are captured while changing the focused object distance. Then by extracting the focused object image data from each captured image data, the extracted object image data and the focused object distance upon capturing the image are corresponded. Then by shifting the extracted object image data by the amounts of parallax according to the respective focused object distances and synthesizing this data, the right eye image data is generated.

If such a method is used, some degree of image capturing procedures is inevitably required. Hence an efficient image capturing operation is demanded in order to prevent a drop in throughput. Also when the extracted object image data is shifted and synthesized, image processing, which reproduces natural brightness and a perspective of an object, is demanded.

SUMMARY

According to an aspect of an embodiment, a processor includes: an imaging control unit which causes an imaging unit for capturing an image with changing a focused object distance, to change the focused object distance with a first change width in the case of a first focused object distance, and to change the focused object distance with a second change width that is smaller than the first change width in the case of a second focused object distance that is shorter than the first focused object distance; and an image processing unit which extracts focused object image data from captured image data for each of the focused object distances, and generates image data by shifting the extracted object image data by parallax amounts corresponding to the respective focused object distances, and by synthesizing the extracted object image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A-2C illustrate a basic operation of an imaging control unit and an image processing unit;
FIG. 3 illustrates an operation procedure of the imaging device;
FIG. 4A-4C illustrate focus object distances.

DESCRIPTION OF EMBODIMENTS

Embodiments will now be described with reference to the drawings. The technical scope, however, is not limited to these embodiments, but extends to matters stated in Claims and equivalents thereof.

Figure 1:
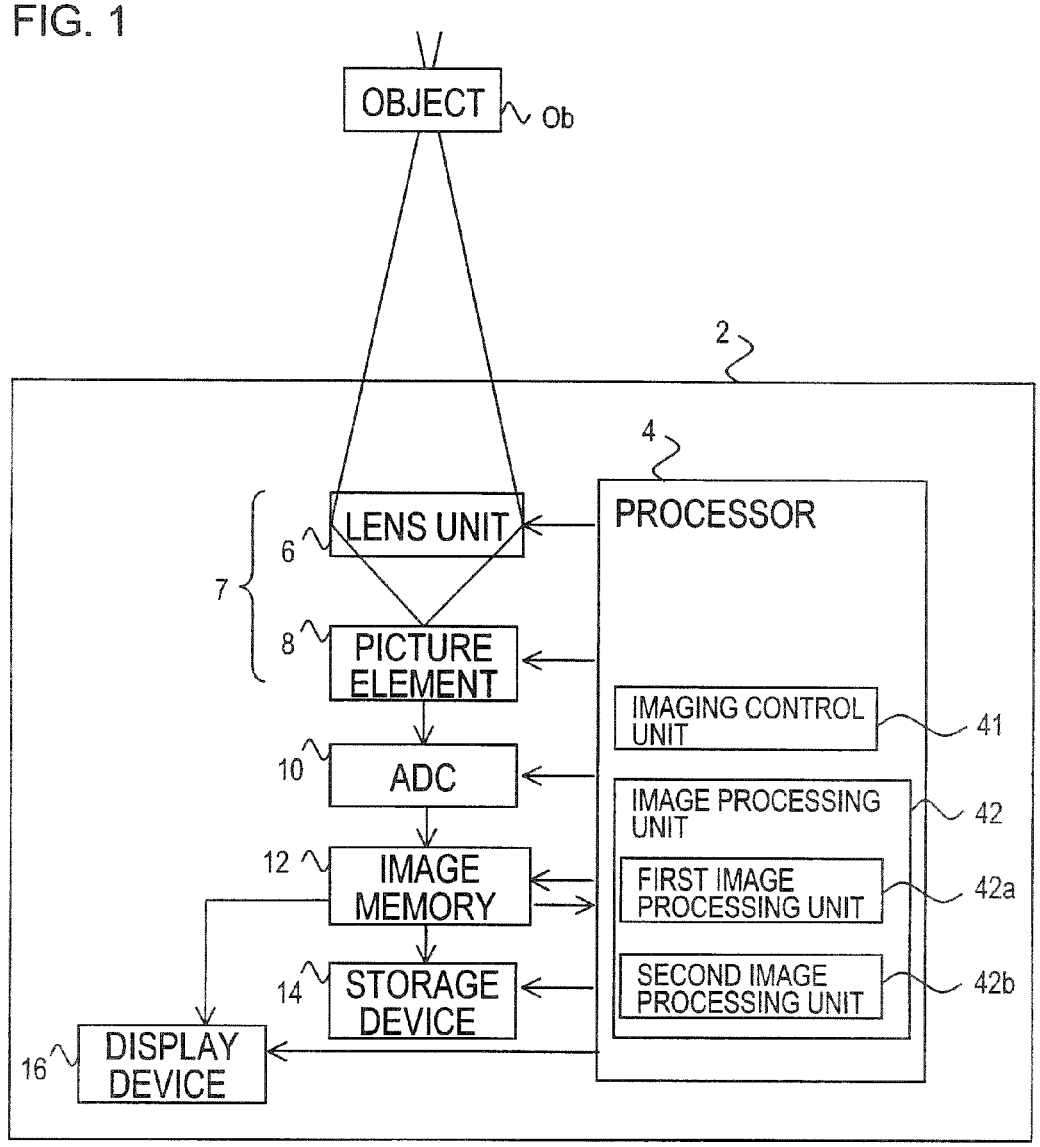
FIG. 1 illustrates a configuration of an imaging device.

FIG. 1 is a diagram illustrating a configuration of an imaging device to which the processor of this embodiment is applied. This imaging device 2 is a single lens digital still camera, for example. The imaging device 2 captures an image of an object Ob by an imaging control unit 41 of the processor 4 causing an imaging unit 7 to change a focused object distance. Then an image processing unit 42 performs image processing on a captured image data for each focused object distance, and generates parallax image data (left eye image data and right eye image data).

The imaging unit 7 has a single lens unit 6 and a picture element 8. The light from the object Ob forms an object image on the picture element 8 via a lens unit 6. The lens unit 6 has a zoom lens in which a plurality of single focus lenses are combined, so that the focused object distance is changed. The picture element 8 includes a CCD (Charge Coupled Device) sensor or a CMOS (Complementary Metal Oxide Semiconductor) sensor, for example, and converts the received light into analog electric signals.

An analog/digital converter 10 converts an analog electric signal, which is output from the picture element 8, into a digital signal. An image memory 12 stores the digital signal, which is output from the analog/digital converter 10, as captured image data. The captured image data is read by the processor 4 and processed by the image processing unit 42, whereby parallax data is generated. The generated parallax image data is stored in the image memory 12, and is transferred to a display device 16 and storage device 14. The display device 16 includes an LCD (Liquid Crystal Display) having a polarizing filter corresponding to parallax of the left and right eyes, and displays a three-dimensional image based on the parallax image data. The storage device 14 writes or reads the parallax data to/from a storage media, such as an IC memory, SD card, memory stick, hard disk and floppy disk®.

The processor 4 includes a microcomputer or ASIC (Application Specific Integrated Circuit), for example. The processor 4 systematically controls the operation of the imaging device 2 by synchronously controlling the imaging unit 7, AD converter 10, image memory 12, storage device 14 and display device 16. The imaging control unit 41 outputs a control signal, which indicates the change width of the focused object distance, to the lens unit 6 of the imaging unit 7. Thereby the focused object distance for the imaging unit 7, to capture an image, is controlled. In the processing unit 4, the image processing unit 42 performs such processing as white balance, gamma correction, image filtering such as a noise filter, and image compression/decompression, for the captured image data. Also as described later, the first image processing unit 42a extracts the focused object image data from the captured image data, and the second image processing unit 42b generates parallax image data from the focused object image data.

The present embodiment relates to the control of the image capturing operation of the imaging unit 7 by the imaging control unit 41, and image processing by the first image processing unit 42a and the second image processing unit 42b.

FIG. 2 is a diagram illustrating a basic operation of the imaging control unit 41 and the image processing unit 42. FIG. 2 illustrates an example of capturing an image with the front face of the lens unit 6 as the left eye direction, and generating a parallax image data from the captured image data. Here the parallax image data includes of left eye image data and right eye image data, which has parallax in the virtual right eye.

First as FIG. 2A illustrates, images are captured under control of the imaging control unit 7 at a plurality of focused object distances D1 to D3, while changing the focused object distances of the lens unit 6. The first image processing unit 42a of the image processing unit 42 detects an object portion which is focused (hereafter focused object portion) Ob1 to Ob3 from the captured image data P1 to P3 obtained for each focused object distance D1 to D3 respectively. At this time, the image processing unit 42a measures the high frequency component amount in the entire captured image data in each of the captured image data P1 to P3, and if the high frequency component amount is high, exceeding a given threshold, for example, the signal processing unit 42a determines that the focused object portions Ob1 to Ob3 exist. Hence the focused object portions Ob1 to Ob3 are detected by detecting the high frequency components. For example, in the case of the captured image data P1, when the focused object distance D1 is the longest, the focused object portion Ob1, which corresponds to a cloud or mountain at a long distance, is detected. In the case of the captured image data P2 when the focused object distance D2 is intermediate, the focused object portion Ob2 corresponding to a house in an intermediate distance is detected. In the case of the captured data P3 when the focused object distance D3 is shortest, the focused object portion Ob3 corresponding to a bus at a short distance is detected.

Then as FIG. 2B illustrates, the first image processing unit 42a deletes the images other than the detected focused object portions Ob1 to Ob3, whereby the object image data OD1 to OD3 corresponding to each focused object portion Ob1 to Ob3 (hereafter called "focused object image data") are extracted. Here the focused object image data OD1 to OD3 and the focused object distance D1 to D3, as the distance information, are corresponded.

Then as FIG. 2C illustrates, the second image processing unit 42b shifts the focused object image data OD1 to OD3 to the left by the parallax amounts (arrows Ar21 to Ar23), to generate the object image data (hereafter called "right eye object image data") rOD1 to rOD2. Here the parallax amount for shifting the focused object image data OD1 to OD3 is determined based on the distance d between the lens unit 6 and lens unit 6r, which is the virtual lens unit 6r corresponding to the right eye, and the focused object distance D1 to D3, as illustrated in FIG. 2A.

The second image processing unit 42b combines the right eye object image data rOD1 to rOD3, and generates the right eye image data PRm. On the other hand, the second image processing unit 42b generates the left eye image data either by using any of the captured image data P1 to P3 as the left eye image data, or by synthesizing the focused object image data OD1 to OD3. In this way, the parallax image data, which includes of the right eye image data PRm and the left eye image data, is generated. Although a case of generating the right eye image data using the left eye image data as a reference is illustrated, left and right may be reversed in this processing.

FIG. 3 is a flow chart illustrating the operation procedure of the imaging device 2. Steps S1 to S4 relate to the imaging operation by the imaging unit 7 which is performed under control of the imaging control unit 41. In step S1, the lens unit 6 of the imaging unit 7 responds to the control signal from the imaging control unit 41, and sets the focused object distance for starting image capturing. In step S2, the imaging unit 7 captures an image, and loads the captured image data into the processor 4. In step S3, the imaging control unit 41 determines whether image capturing is completed for a given number of times, set in advance. If not completed (NO in step S3), the imaging control unit 41 outputs a control signal to indicate the next focused object distance to the imaging unit 7 in step S4, and responding to this, the imaging unit 7 sets the focused object distance indicated by the control signal. And processing returns to step S2. This procedure is repeated until image capturing is completed for a number of times being set.

When image capturing is completed (YES in step S3), the first image processing unit 42a detects a focused object portion in each captured image data in step S5, and deletes the other images to extract the focused object image data.

Steps S6 to S12 relate to image processing by the second image processing unit 42b. The detail of each processing will be described later. In step S6, the second image processing unit 42b performs processing to transform the focused object image data. The transforming processing includes enlarging/reducing the size of the object image. Then in step S7, the second image processing unit 42b performs brightness correction processing for the focused object image data. Then in step S8, the second image processing unit 42b performs color saturation correction processing for the focused object image data. Then in step S9, the second image processing unit 42b performs gradation processing for the focused object image data. Then in step S10, the second image processing unit 42b synthesizes the focused object image data, and generates the left eye image data. One of the captured image data may be used as the left eye image data in step S10. Then in step S11, the second image processing unit 42b shifts the focused object image data by the parallax amounts and synthesizes the data, so as to generate temporary right eye image data. Then in step S12, the second image processing unit 42b performs interpolation processing for a portion which is behind the object for the temporary right eye image data. By this procedure, the parallax image data is generated.

Now the imaging operation in steps S1 to S4 and the image processing in step S6 and later will be described separately.

[Imaging Operation]

According to this embodiment, when the imaging unit 7 captures an image while changing the focused object distance, the imaging control unit 41 outputs a control signal to indicate the change width of the focused object distance to the lens unit 6 of the imaging unit 7, and changes the focused object distance with this change width. The imaging control unit 41 controls the change width by the following two control modes.

In the first control mode, the imaging control unit 41 causes the imaging unit 7 to change the focused object distance with a large change width if the focused object distance is long, that is, if an image of an object in a long distance is captured, and with a small change width if the focused object distance is short, that is, if an image of an object in a short distance is captured. In the second control mode, the imaging control unit 41 causes the imaging unit 7 to change the focused image distances with such a change width that the focal distance ranges corresponding to a depth of field of each focused object distance overlap as little as possible, and preferably become continuous. The first and second control modes will be described in concrete terms with reference to FIG. 4 to FIG. 7.

FIG. 4 is a diagram illustrating the first control mode. In the first control mode, an image is captured n times (n>1) in a distance range L0 where the lens unit 6 focuses. FIG. 4A to FIG. 4C illustrate the lens unit 6, picture element 8 and objects Ob1 to Ob3 at respective focused object distances when three types of focus object distances D1 to D3 are used. FIG. 4A is a case of the focused object distance D=L0, which is the longest, FIG. 4B is a case of the focused object distance D=L/2, which is the second longest, and FIG. 4C is a case of the focused object distance D=L/n, which is the shortest.

The imaging control unit 41 outputs a control signal to set the focused object distance D of the lens unit 6 to, for example, the longest focused object distance L0 in step S1 in FIG. 3, for example. Then steps S2 to S4 are executed, and the imaging control unit 41 changes the focused object distance in the imaging unit 7. At this time, the imaging control unit 41 changes a focused object distance to have a larger change width as the focused object distance is longer, and to have a smaller change width as the focused object distance is shorter. Specifically, the focused object distance is controlled to be decreased gradually, such as L0 (FIG. 4A)→L0/2 (FIG. 4B)→L0/3→L0/4 . . . →L0/(n−2)→L0/(n−1)→L0/n (FIG. 4C) (n is a number of times of capturing an image, and is a 1 or greater value). Or the focused object distance D may be gradually increased from L0/n to L0. At this time, the focused object distance D, the longest distance L0 and the number of times of image capturing n have the following relationship.

$$D = L0/n \ (n>1)$$

Instead of n, 2 to the mth power (m is an integer) may be used.

Figure 5:
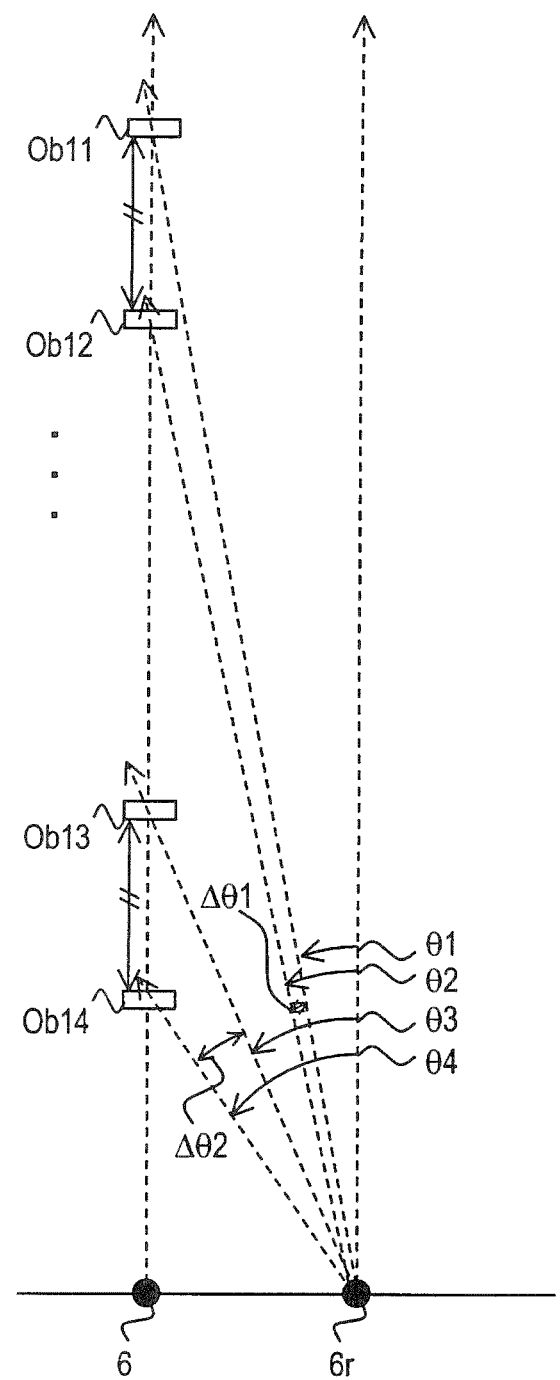
FIG. 5 illustrates examples of objects.

FIG. 5 is a diagram illustrating the relationship between the change width of the focused object distance and parallax. FIG. 5 illustrates objects Ob11, Ob12, Ob13 and Ob14, which are located at equal interval in the front face direction of the lens unit 6. The objects Ob11 and Ob12 are positioned in a relatively long distance, and the objects Ob13 and Ob14 are position in a relatively short distance. Here the parallaxes of the objects Ob11 and Ob12 in the right eye virtual lens unit 6r are $\theta1$ and $\theta2$ respectively, and the difference of parallaxes is $\Delta\theta1$. On the other hand, the parallaxes of the objects Ob13 and Ob14 are $\theta3$ and $\theta4$, and the difference thereof is $\Delta\theta2$.

Comparing the differences of the parallaxes $\Delta\theta1$ and $\Delta\theta2$, the difference $\Delta\theta2$ is greater than the difference $\Delta\theta1$. In other words, the influence of the distance difference between objects in the short distance on the difference of parallaxes is greater than the influence of the distance difference between objects in the long distance on the difference of parallaxes. This means that when observing with the naked eye, the distance difference of the objects in the long distance is less recognized as parallax, but the distance difference of the objects in the short distance is easily recognized as parallax.

Here it is assumed that the images of the objects Ob11 and Ob12 in the long distance are captured with the same depth of field of the focused object distance, and a same focused object distance is corresponded to the respective distance information. In this case, even if the focused object image data of the objects Ob11 and Ob12 are shifted respectively with the same parallax amount corresponding to the focused object distance, no odd sensation is generated since the difference $\Delta\theta1$ between parallaxes $\theta1$ and $\theta2$ is small. But on the other hand, it is assumed that the images of the objects Ob13 and Ob14 in the short distance are captured with a same depth of field of the focused object distance, and the same focused object distance is corresponded to the respective distance information. In this case, if the focused object image data is shifted respectively with a same parallax amount corresponding to the focused object distance, a highly odd visual sensation is generated, since the difference $\Delta\theta2$ between parallaxes $\theta3$ and $\theta4$ is large.

In the first control mode in this embodiment, images of the objects Ob13 and Ob14 in the short distance are captured with different focused object distances by changing the focused object distance with a smaller change width as the focused object distance is shorter. Therefore the respective object image data of the objects Ob13 and Ob14 are shifted by the parallax amounts according to the respective focused object distances. As a result, a natural right eye image, with less of an odd sensation, is generated.

Figure 6C:
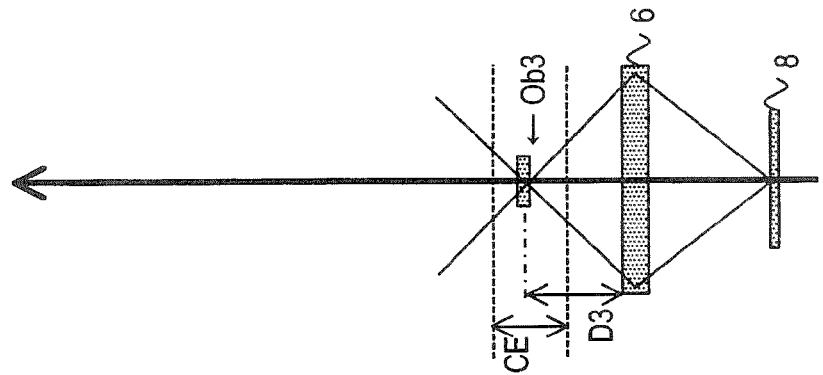
FIG. 6A-6C illustrate focus object distances.
Figure 6B:
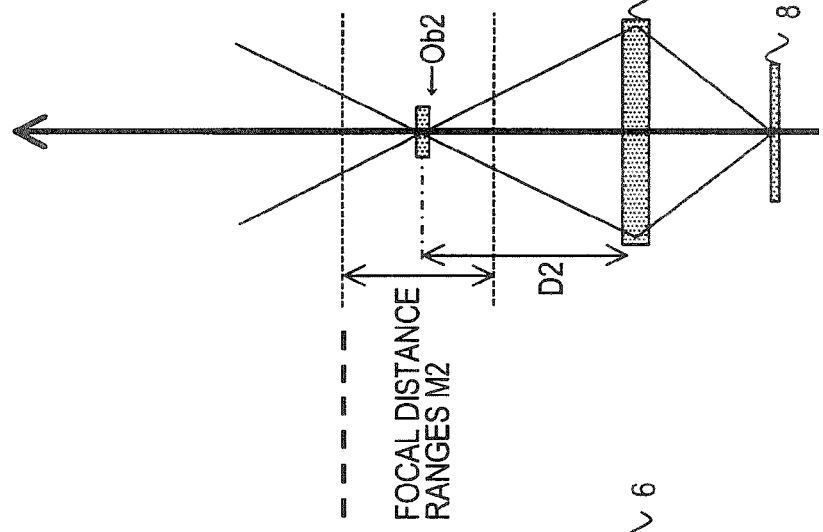
Figure 6A:
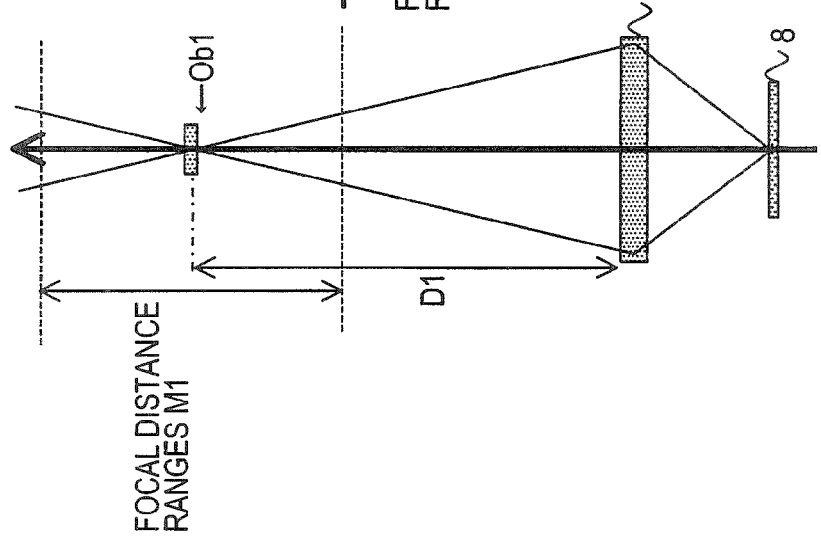

FIG. 6 is a diagram illustrating the second control mode. FIG. 6A to FIG. 6C illustrate the lens unit 6, picture element 8 and objects Ob1 to Ob3 in respective focused object distances when the imaging unit 7 captures images using focused object distances D1 to D3. FIG. 6A to FIG. 6C also illustrate the focal distance ranges M1 to M3 corresponding to the depth of field of each focused object distances D1 to D3.

In step S1 in FIG. 3, for example, the imaging control unit 41 sets the focused object distance of the lens unit 6 to the longest focused object distance D1 illustrated in FIG. 6A. Then steps S2 to S4 are executed. At this time, the imaging control unit 41 causes the imaging unit 7 to change the focused object distances D1 to D3 with such a change width D1-D2 and D2-D3 that the focal distance ranges M1 to M3 overlap as little as possible, and preferably the focus distance ranges M1 to M3 become continuous, as illustrated in FIG. 6A to FIG. 6C. Since the depth of field of each focused object distance is deeper (longer distance) as the focused object distance is longer, and shallower (shorter distance) as the focused object distance is shorter, the focal distance ranges M1 to M3 corresponding to the focused object distances D1 to D3 (here D1>D2>D3) have the relationship of M1>M2>M3. In order to minimize overlapping of the focal distance ranges M1 to M3, and preferably the focus distance ranges M1 to M3 become continuous, the imaging control unit 41 causes the imaging unit 7 to change the focused object distance with a gradually decreasing change width D1-D2 and D2-D3. The focused object distances may be changed in the reverse sequence, as D3, D2 and D1, but in this case, the change width is controlled to be gradually increased.

If a pitch width for changing the focused object distance is fixed, and controlling with a change width with which the focal distance ranges M1 to M3 become continuous is difficult, and an overlap is generated between the focal distance ranges M1 and M2, or between M2 and M3, then the imaging control unit 41 may make the focal distance ranges continuous by adjusting the focal distance ranges. For example, the imaging control unit 41 changes the focal distance range by controlling the effective aperture of the lens in the lens unit 6. In this case, insufficient or excessive quantity of light due to the change of the effective aperture is corrected by adjusting the exposure time, or by adjusting the analog gain or digital gain of the electric signal corresponding to the captured image data.

Figure 7:
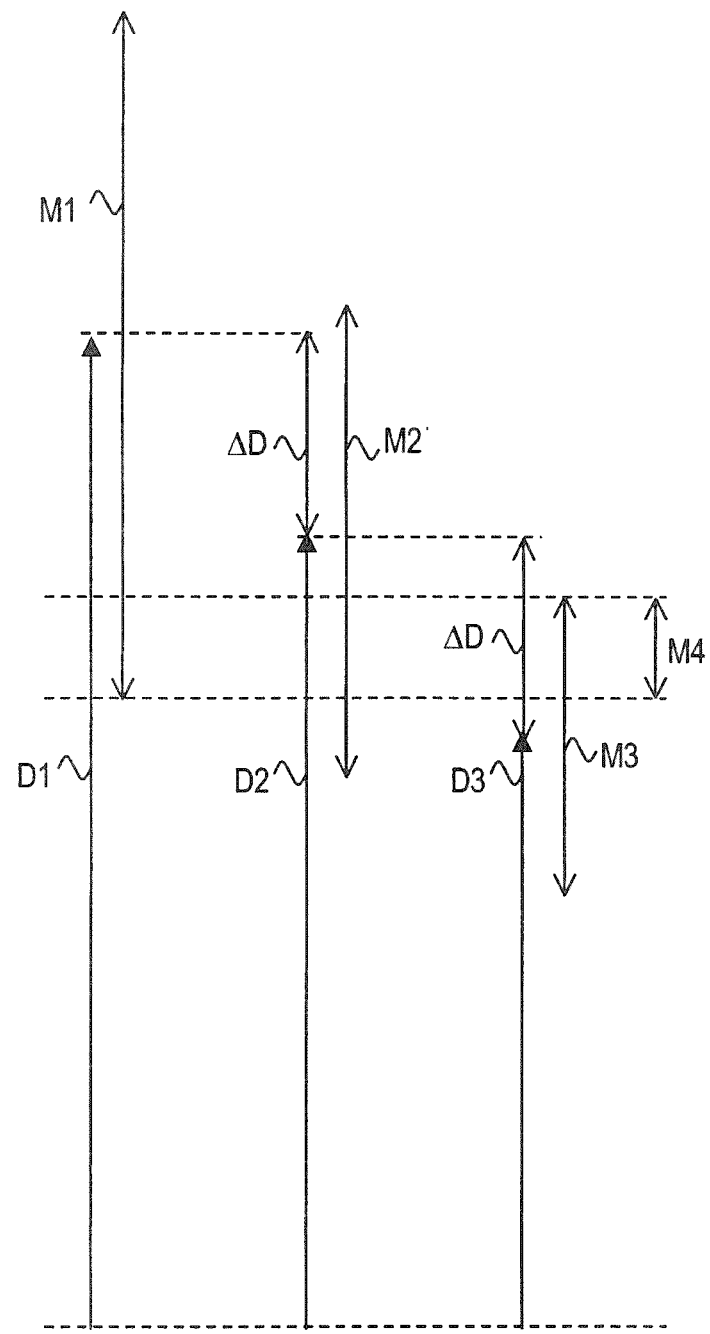
FIG. 7 illustrates focal distance ranges.

FIG. 7 illustrates a case of changing the focused object distance with an equal change width, to be compared with the second control mode. FIG. 7 illustrates the respective focal distance ranges M1 to M3 of the focused object distances D1 to D3 when the imaging unit 7 changes the focused object distances D1 to D3 (D1>D2>D3) with an equal change width ΔD.

When the focal distance range is deep corresponding to the focused object distance, and the change width ΔD is small compared with the focal distance range, the range where the focal distance ranges M1, M2 and M3 overlap increases as illustrated in FIG. 7. Particularly in the distance range M4, the focal distance ranges M1 and M3 overlap before and after changing the two change widths. In this case, the focal distance range M2 overlaps in the entire region thereof with one or both of the focal distance ranges M1 and M3. Therefore the focused object image data obtained in the focal distance range M2 is also redundantly obtained in the focal distance ranges M1 and M3. In this case, the image capturing in the focused object distance D2 involves unnecessary steps. If redundant captured image data increases, unnecessary processing also increases.

However according to the second control mode of this embodiment, the focused object distances D1 to D3 are changed with a change width with which the focal distance ranges M1 to M3 overlap as little as possible, and preferably become continuous. The focal distance ranges may overlap somewhat between adjacent focused object distances. Even if the focal distance ranges M1 and M2 or M2 and M3 have some overlapped portion respectively, the generation of unnecessary image capturing steps or unnecessary image processing in the focused object distance D2, as illustrated in FIG. 7, is avoided if at least the focal distance ranges M1 and M3, having two change widths, are apart without an overlap. As a result, throughput improves accordingly.

Even in the case when a same object is included in two captured images, since two focal distance ranges partially overlap, and overlapped focused object image data is extracted in step S5 in FIG. 3, the first image processing unit 42a eliminates an overlap by keeping the focused object image data in the short focal distance range, and deleting the focused object image data in the long focal distance range (or vice versa), for example.

In the second control mode as well, the change width decreases as the focused object distance decreases, so as illustrated in FIG. 5, images of objects in short distance of which parallax is large are captured with different focused object distances respectively. Therefore the focused object image data are shifted with different parallax amounts, and more natural right eye image data is generated.

Now the image processing in step S6 or later in FIG. 3 will be described. Each image processing to be described below may be in practice alone or in combination of two or more image processings.

[Transforming Processing]

Figure 8:
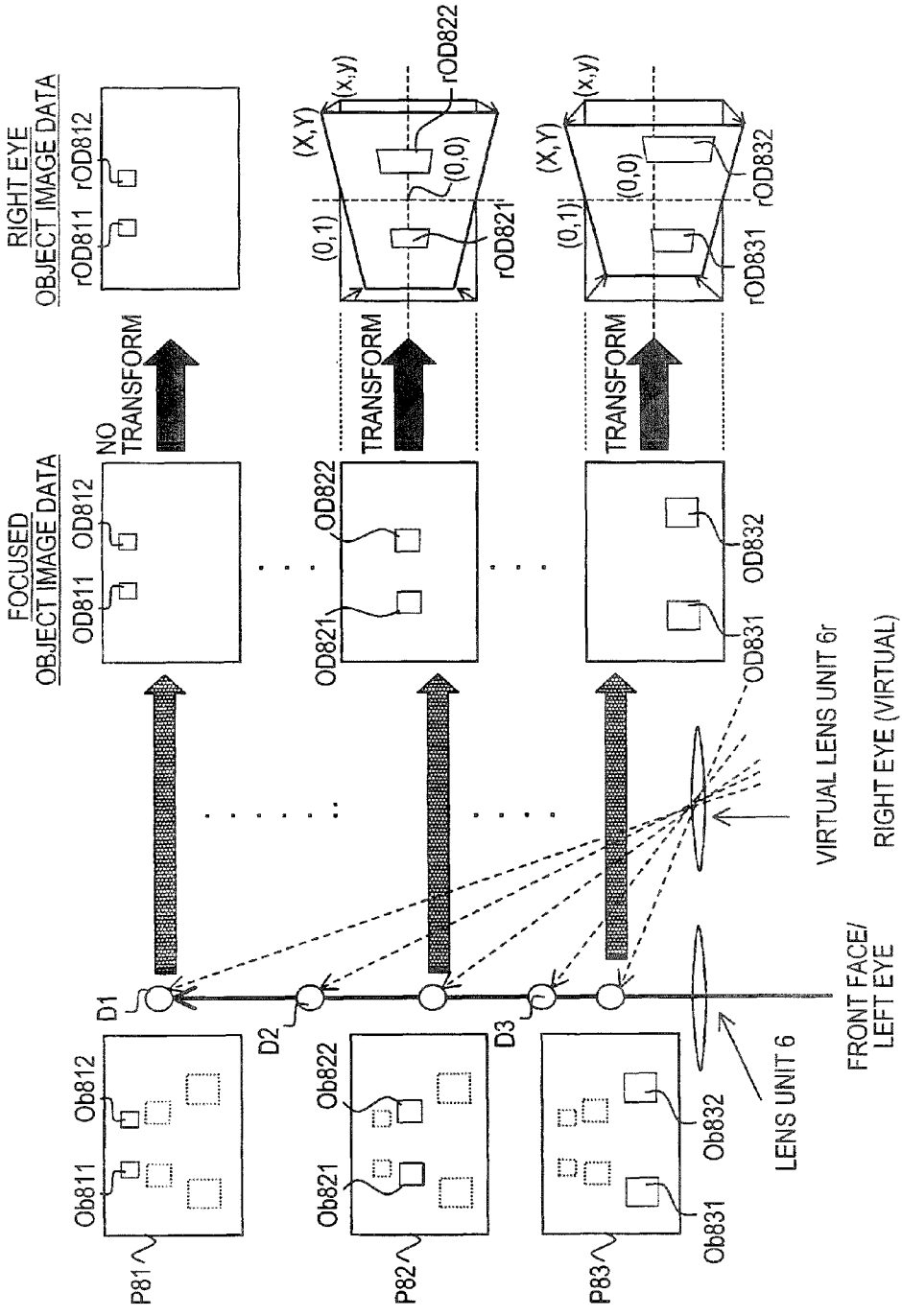
FIG. 8A-8C illustrate a transforming processing of focused object image data.

FIG. 8 is a diagram illustrating the transforming processing of focused object image data. First the first image processing unit 42a detects a focused object portion from captured image data P81 to P83 in the focused object distances D1 to D3 (D1>D2>D3) of the lens unit 6, as illustrated in FIG. 8A. For example, focused object portions Ob811 and Ob812, corresponding to an object in a long distance are detected in captured image data P81, focused object portions Ob821 and Ob822 corresponding to an object in an intermediate distance are detected in captured image data P82, and focused object portions Ob831 and Ob832 corresponding to an object in a short distance are detected in the captured image data P83 respectively.

Then as FIG. 8B illustrates, the first image processing unit 42a extracts the focused object image data OD811 and OD812 corresponding to the focused object portions Ob811 and Ob812 from the captured image data P81, the focused object image data OD821 and OD822 corresponding to the focused object portions Ob821 and Ob822 from the captured image data P82, and the focused object image data OD831 and OD832 corresponding to the objects Ob831 and Ob832 from the captured image data P83.

Then as FIG. 8C illustrates, the second image processing unit 42b transforms the focused object image data OD811, OD812, OD821, OD822, OD831 and OD832 according to the corresponding focused object distances D1 to D3. Then the second image processing unit 42b shifts the focused object image data OD811, OD812, OD821, OD822, OD831 and OD832 by the parallax amounts in the virtual lens unit 6r according to the focused object distances D1 to D3, so as to generate right eye focused object data rOD811, rOD812, rOD821, rOD822, rOD831 and rOD832.

In the transforming processing, transformation is performed so that the image at the left is small and the image at the right is large to a degree according to the focused object distance. In other words, transformation is performed so that the size in a direction (y axis) crossing the parallax direction (x axis) becomes smaller in an image more to the left and larger in an image more to the right. For example, when the horizontal direction of each frame is the X axis and the vertical direction thereof is the Y axis, and the center coordinates of the image are (0, 0), the coordinate positions (x, y) before transformation are converted into coordinate positions (X, Y) after transformation using the following expression.

$$X = \alpha \cdot x$$

$$Y = Y \cdot f(x)$$

$$f(x) = \beta \cdot x + \gamma$$

Where α and β are coefficients to indicate the degree of transformation, and α increases according to the focused object distance, β decreases according to the focused object distance, and γ decreases according to the focused object distance. Here α, β and γ are all positive values. According to this processing, the focused object image data is transformed with the horizontal center of the frame as the boundary, so that the image at the left is reduced in both the x and y axis directions, and the image at the right is reduced in the x axis direction, and expanded in the y axis direction.

Therefore the focused object image data OD811 and OD812 at the longest focused object distance D1 are hardly transformed, but the focused image data OD821 and OD822 at the intermediate focused object distance D2 are transformed so that the focused object image data OD821 at the left becomes somewhat smaller, and the focused object image data OD822 at the right becomes somewhat larger. The focused object image data OD831 and OD832 at the shortest focused object distance D3 are transformed so that the focused object image data OD831 at the left becomes still smaller, and the focused object image data OD832 at the right becomes still larger. The procedure to perform this transformation processing corresponds to step S6 in FIG. 3.

This transformation processing based on that even if objects are located in a same focused object distance, the objects appear smaller as they become closer to the left, and appear larger as they become closer to the right according to the distance from the right eye. This will be described with reference to FIG. 9.

Figure 9:
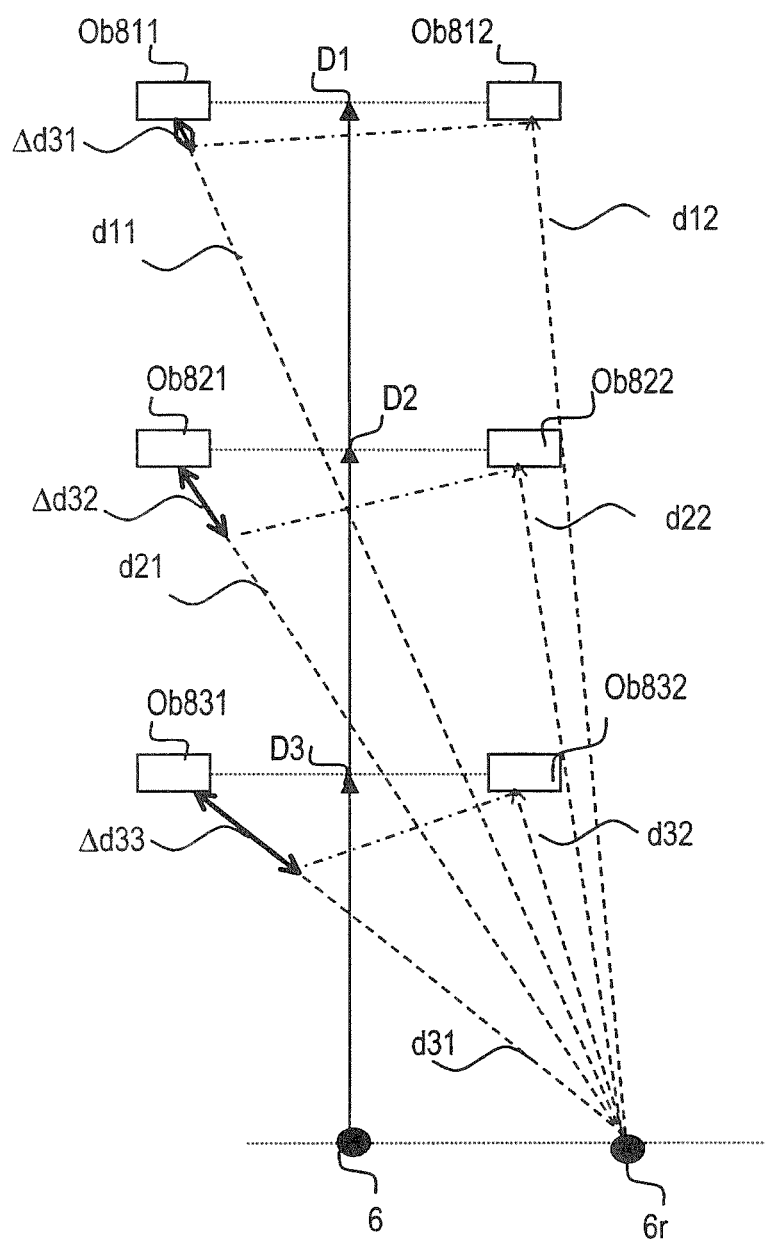
FIG. 9 illustrates examples of positions of objects.

FIG. 9 is a plain view illustrating positions of the objects of the example in FIG. 8. Here the same reference symbols as the focused object portions in FIG. 8 are denoted for each object. In FIG. 9, the objects Ob811 and Ob812 are illustrated in the focused object distance D1 of the lens unit 6, the objects Ob821 and OB822 are illustrated in the focused object distance D2 thereof, and the objects Ob831 and Ob832 are illustrated in the focused object distance D3 thereof. When the horizontal direction is a direction coupling the lens unit 6 of the left eye and the virtual lens unit 6r of the right eye, the distance difference of Ob811 and Ob812 in the horizontal direction, the distance difference of Ob821 and Ob822 in the horizontal direction, and the distance difference of Ob831 and Ob832 in the horizontal direction are all the same.

In terms of the distance from the virtual lens unit 6r of the right eye to each object, the parallax amount of an object at the left is greater than the parallax amount of an object at the right if the focused object distance is the same, so the distance to the object at the left is longer than the distance to the object at the right. Therefore in the longest focused object distance D1, the distance d11 to the object Ob811 is longer than the distance d12 to the object Ob812 by the distance difference Δd31. In the intermediate focused object distance D2, the distance d21 to the object Ob821 is longer than the distance d22 to the object Ob822 by the distance difference Δd32 (>Δd31). In the shortest focused object distance D3, the distance d31 to the object Ob831 is longer than the distance d32 to the object Ob832 by the distance Δd33 (>Δd32).

In this way, even if objects are at the same focused object distance, the distance to the object at the left appears longer and the distance to the object at the right appears shorter from the view of the virtual lens unit 6r of the right eye. Hence the object at the left appears larger and the object at the right appears smaller. The distance difference of the left and right objects from the virtual lens unit 6r of the right eye decreases as the focused object distance increases, and increases as the focused object distance decreases. Therefore the apparent difference of the sizes of the objects at the left and right decreases as the distance increases, and the apparent difference of the sizes of the objects at the left and right increases as the distance decreases.

As a result, the right eye image data expressing a natural perspective is generated by synthesizing the right eye focused object data rOD811, rOD812, rOD821, rOD822, rOD831 and rOD832 after the transformation processing in FIG. 8 is performed. Then based on this data, a more natural three-dimensional image is generated.

In FIG. 8 and FIG. 9, the case of the left and right object image data corresponding to different objects was described as examples. However the description in FIG. 8 and FIG. 9 are also applied to the object image data of a single object. In this case, each portion of the single object image data corresponds to the object image data. And the above mentioned transformation processing is executed for each object image data according to the coordinates in one frame. Thereby a three-dimensional image which has a perspective transformed to be smaller at the left and larger at the right is generated even for a single object.

[First Brightness Correction Processing]

Figure 10:
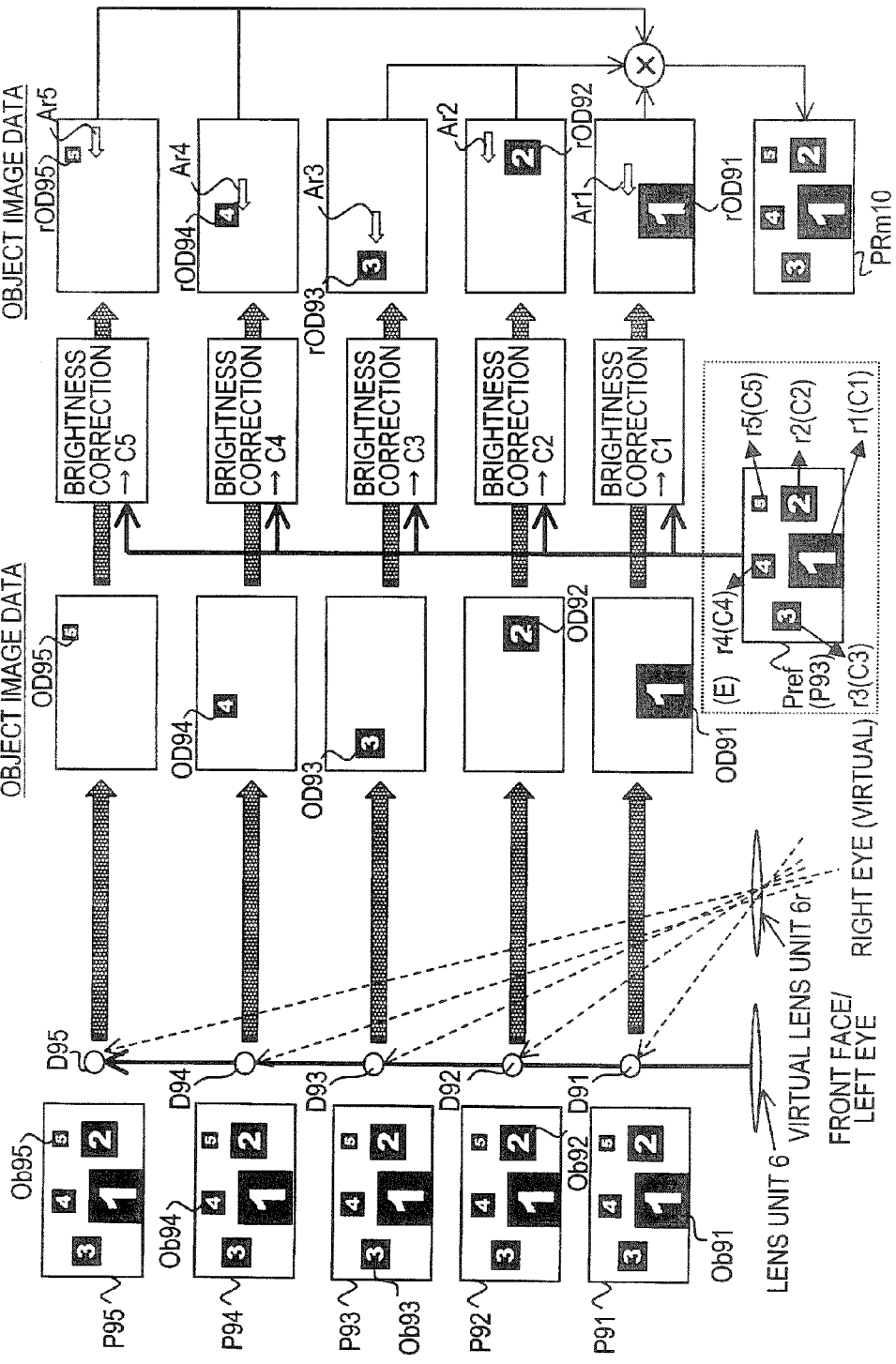
FIG. 10A-10D illustrate a first brightness correction processing.

FIG. 10 is a diagram illustrating a first brightness correction processing of the focused object image data. Here the brightness corresponds to the Y value when RGB (Red, Green, Blue) pixel values of the captured image data is converted into YCbCr, for example.

The first image processing unit 42a detects the focused object portions Ob91 to Ob95 in the captured image data P91 to P95 in the focused object distances D91 to D95 of the lens unit 6, as illustrated in FIG. 10A. Here an object "1" corresponding to the focused object portion Ob91, object "2" corresponding to the focused object portion Ob92, object "3" corresponding to the focused object portion Ob93, object "4" corresponding to the focused object portion Ob94, and object "5" corresponding to the focused object portion Ob95 have a longer distance from the lens unit 6 in this sequence. Since the focused object distances D91 to D95 increases in this sequence, the focused object portion Ob91 is detected in the captured image data P91 in the focused object distance D1, the focused object portion Ob92 is detected in the captured image data P92 in the focused object distance D2, the focused object portion Ob93 is detected in the captured image data P93 in the focused object distance D3, the focused object portion Ob94 is detected in the captured image data P94 in the focused object distance D4, and the focused object portion Ob95 is detected in the captured image data P95 in the focused object distance D5 respectively. Then as FIG. 10B illustrates, the first image processing unit 42a extracts the focused object image data OD91 to OD95 corresponding to the focused object portions Ob91 to Ob95 from the captured image data P91 to P95 respectively.

If a fairly uniform quantity of light is supplied to each object when the image is captured, the focused object portions Ob91 to Ob95 in the captured image data P91 to P95 have similar brightness because of automatic exposure control. Then in the right eye image data synthesized in this state, both the image in the long distance and the image in the short distance have the same brightness. In a naturally captured image however, the brightness of the image is lower, that is darker, as the distance from the lens unit 6 increases, and brightness thereof is higher, that is brighter, as the distance decreases.

Hence the second image processing unit 42b corrects the brightness of the focused object image data OD91 to OD95 to be brightness according to the focused object distance D91 to D95. Specifically, the second image processing unit 42b selects any of the captured image data P91 to P95, such as the captured image data P93 of the intermediate focused object distance D93, as a reference captured image data Pref as illustrated in FIG. 10E. Here in the reference captured image data Pref (captured image data P93), the focused object portion Ob93 is focused, the rest is not focused. So the second image processing unit 42b obtains the respective coordinates of the focused object image data OD91 to OD95, and detects the brightnesses C1 to C5 from the corresponding coordinate regions r1 to r5 in the reference captured image data Pref (captured image data P3). At this time, representative values, such as the average value, central value or intermediate value, of the brightness in the coordinate regions are detected.

Then as FIG. 10C illustrates, the second image processing unit 42b corrects the brightness of the focused object image data OD91 to OD95 to be the detected brightnesses C1 to C5. This brightness correction processing procedure corresponds to step S7 in FIG. 3.

After this brightness correction processing, the second image processing unit 42b shifts the focused object image data OD91 to OD95 according to the parallax amounts in the virtual lens unit 6r (arrows Ar1 to Ar5), as illustrated in FIG. 10D, and generates right eye object image data rOD91 to rOD95. Then the second image processing unit 42b synthesizes the right eye object image data rOD91 to rOD95 to generate right eye image data PRm10. On the other hand, the second image processing unit 42b uses the captured image data P93 selected as the reference captured image data Pref as left eye image data. Or the second image processing unit 42b synthesizes the focused object image data having the corrected brightness to generate the left eye captured image data.

By this processing, the right eye image data, that reproduces natural brightness corresponding to the perspective of an object, is generated, even if each focused object portion is corrected to a similar brightness by an automatic exposure adjustment function when the captured image data P91 to P95 are processed. As a result, a more natural three-dimensional image is generated based on this data.

[Second Brightness Correction Processing]

Figure 11:
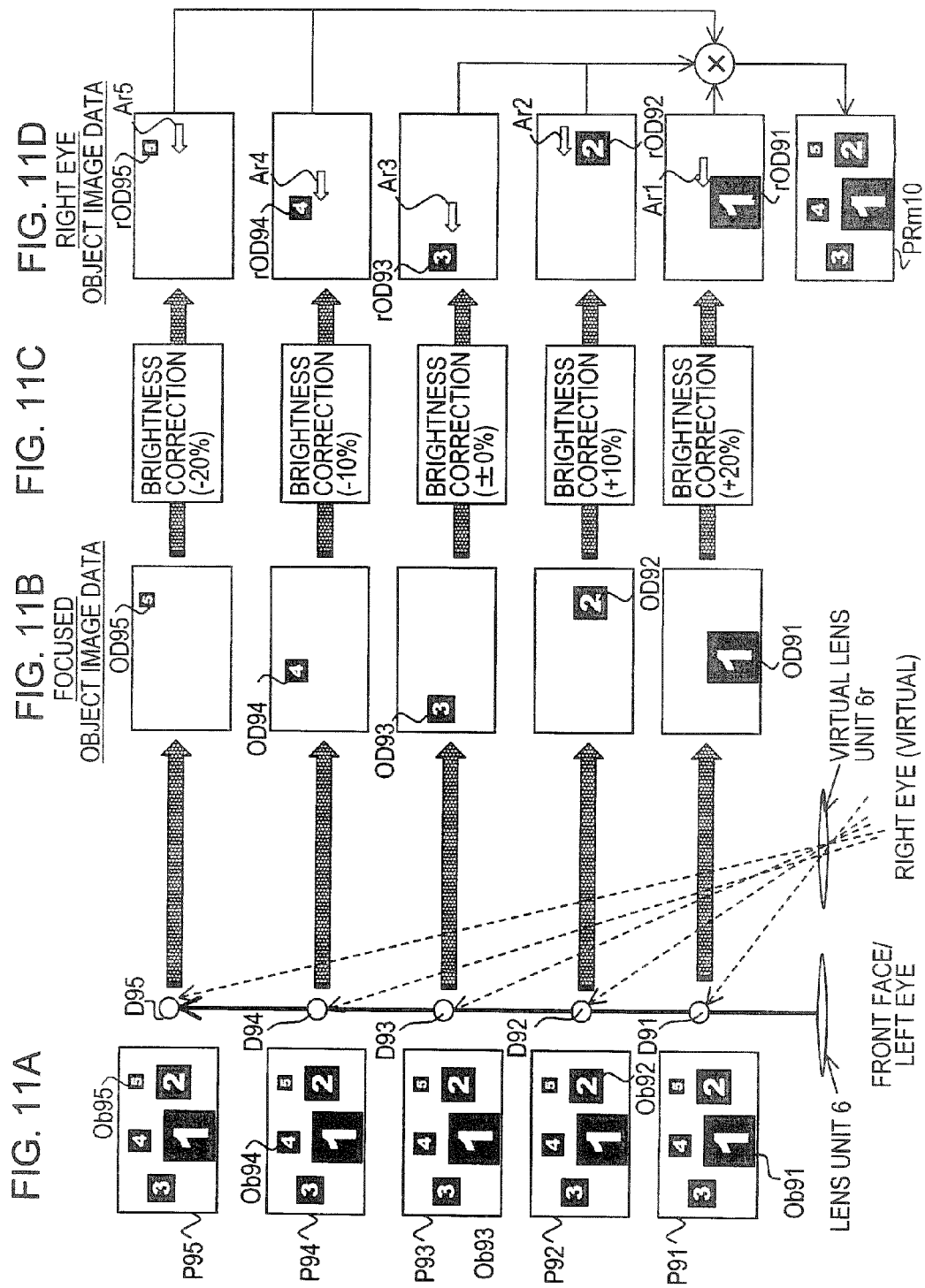
FIG. 11A-11D illustrate a second brightness correction processing.

FIG. 11 is a diagram illustrating a second brightness correction processing. The differences between FIG. 11 and FIG. 10 are that FIG. 11 has no drawing corresponding to FIG. 10E, and FIG. 11C is different from FIG. 10C. In the case of the second brightness correction processing, the second image processing unit 42b corrects brightness of the object image data OD91 to OD95 according to the focused object distance P91 to P95, instead of using the reference captured image data. For example, the focused object distances D91 to D95 increases in this sequence, so the brightness of the corresponding focused object image data OD91 to OD95 decreases in this sequence. Therefore as FIG. 11C illustrates, the second image processing unit 42b corrects the brightness of the focused object image data OD91, OD92, OD93, OD94 and OD95 to be −20%, −10%, ±0%, +10% and +20% respectively.

According to the second brightness correction processing, even if each focused object portion is corrected to similar brightness by an automatic exposure adjustment function when the captured image data P91 to P95 are processed, the increased or decreased brightness is returned to the original brightness according to the focused object distance. Therefore the left eye image data and the right eye image data, which reproduce natural brightness corresponding to the perspective of the object, are generated. Based on this data, a more natural three-dimensional image is generated.

Figure 12:
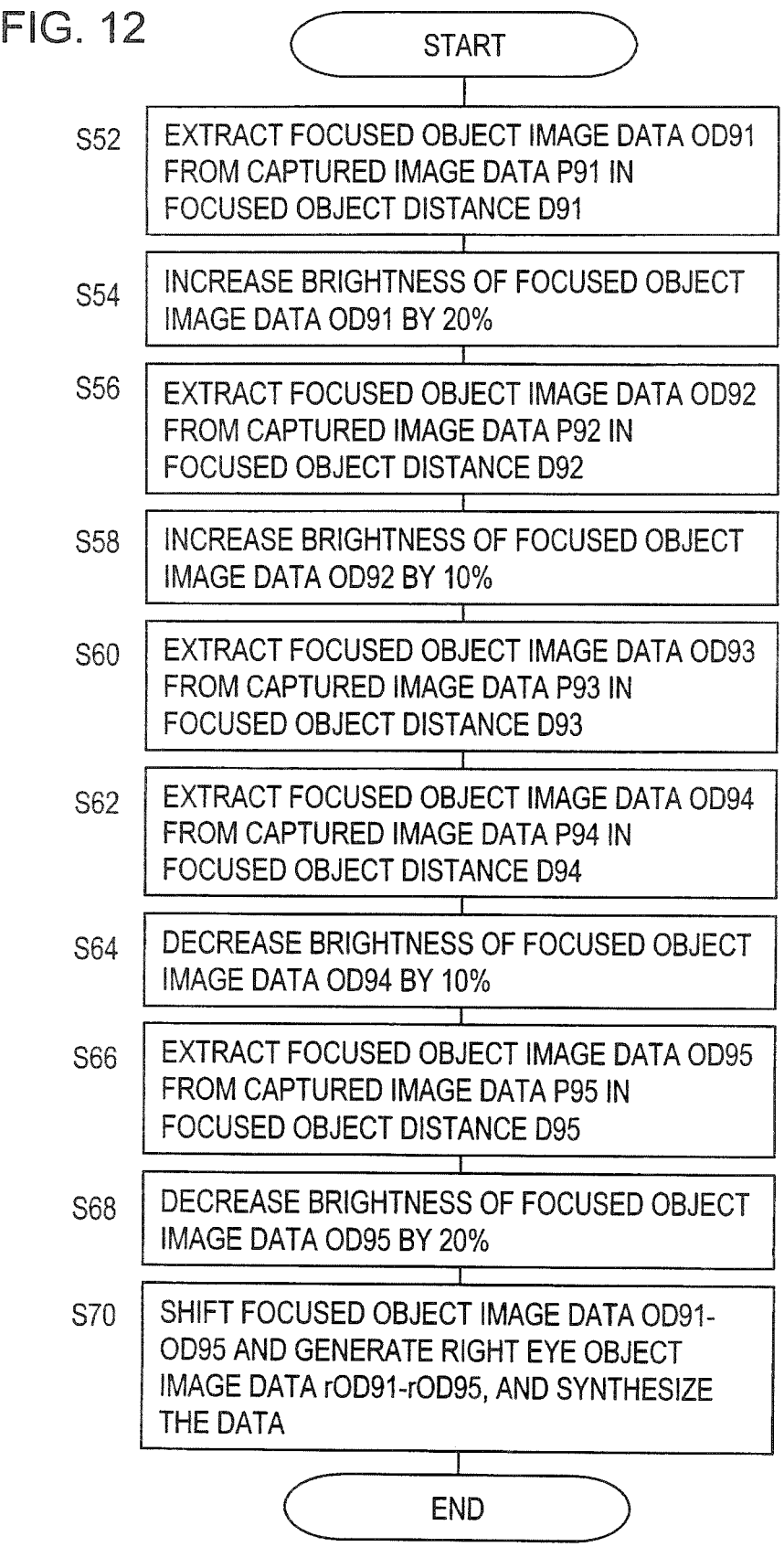
FIG. 12 illustrates a procedure of the second brightness correction processing.

FIG. 12 is a flow chart illustrating the procedure of the second brightness correction processing. In step S52, the first image processing unit 42a extracts the focused object image data OD91 from the captured image data P91 in the focused object distance D91. Then in step S54, the second image processing unit 42b increases the brightness of the focused object image data OD91 by 20%. Then in step S56, the first image processing unit 42a extracts the focused object image data OD92 from the captured image data P92 in the focused object distance D92. Then in step S58, the second image processing unit 42b increases the brightness of the focused object image data OD92 by 10%. Then in step S60, the first image processing unit 42a extracts the focused object image data OD93 from the captured image data P93 in the focused object distance D93. In this case, the brightness of the focused object image data OD93 is unchanged. Then in step S62, the first image processing unit 42a extracts the focused object image data OD94 from the captured image data P94 in the focused object distance D94. Then in step S64, the second image processing unit 42b decreases the brightness of the focused object image data OD94 by 10%. Then in step S66, the first image processing unit 42a extracts the focused object image data OD95 from the captured image data P95 in the focused object distance D95. Then in step S68, the second image processing unit 42b decreases the brightness of the focused object image data OD95 by 20%. Then in step S70, the second image processing unit 42b shifts the focused object image data OD91 to OD95 and generates the right eye object image data rOD91 to rOD95, and synthesizes this data.

Figure 13:
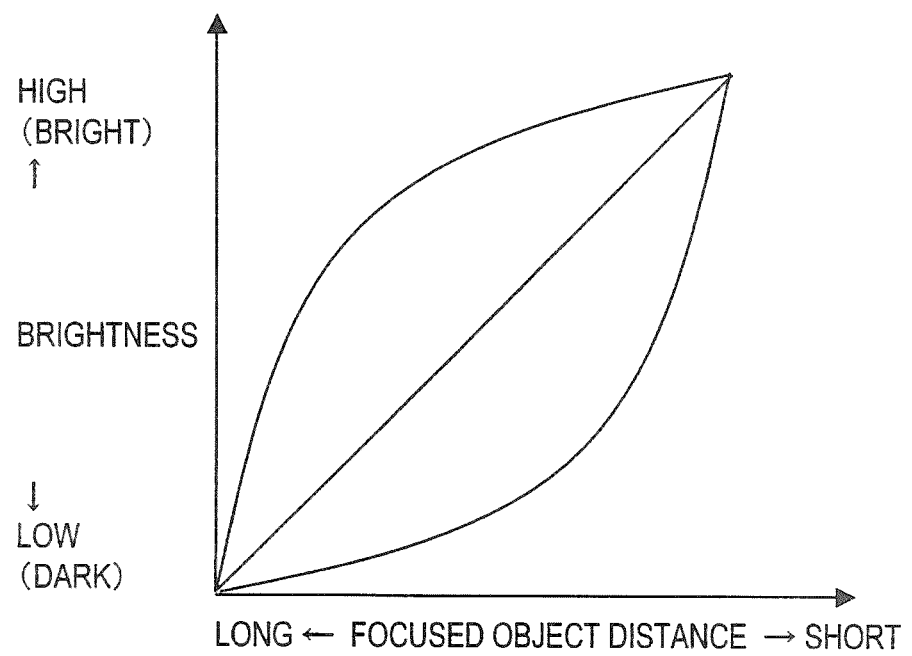
FIG. 13 illustrates a map data of brightness and the focused object distance.

According to a variant form of the second brightness correction processing, map data, where the focused object distance and brightness are corresponded, is provided in the image processing unit 42 in advance, and based on this map data, the second image processing unit 42b corrects the brightness of each focused object image data. FIG. 13 illustrates an example of map data, in which brightness changes linearly or non-linearly according to the focused object distance. From this map data, the second image processing unit 42b reads brightness corresponding to the focused object distance of each focused object image data, and corrects the brightness to be this brightness. According to this method, a more accurate brightness correction is implemented considering the optical characteristics of the lens unit 6, the quantity of electric charges generated by the picture element 8 according to the quantity of light, and the output characteristics of the display device 16 or the like.

[Color Saturation Correction Processing]

The second image processing unit 42b corrects the color saturation of the focused object image data. Here color saturation is a distance from the achromatic color axis in the CbCr (color difference) space when the RGB pixel values of the captured image data are converted into YCbCr, and corresponds to a square root of $(Cb^2+Cr^2)$.

For the color saturation correction processing, processing similar to the processing described in FIG. 10 to FIG. 13 is applied. For example, as illustrated in FIG. 10, the second image processing unit 42b selects the reference captured image data Pref from the captured image data P91 to P95, and corrects the respective color saturation of the focused object image data OD91 to OD95 to be representative color saturations of the coordinate regions to which the focused object image data OD91 to OD95 correspond to in the reference captured image data Pref. Or the second image processing unit 42b adjusts the color saturation of each focused object image data OD91 to OD95 according to the focused object distances D91 to D95, in a similar manner to as illustrated in FIG. 11 and FIG. 12. In this case, the correction is performed so that the color saturation is decreased as the distance of the object increases, and the color saturation is increased as the distance of the object decreases. The image processing unit 42 has the map data illustrated in FIG. 13 in which the focused object distance and color saturation are corresponded, and the second image processing unit 42b refers to this and corrects the respective color saturation of the focused object image data OD91 to OD95, so that the color saturation corresponds to the focused object distance. This color saturation correction procedure corresponds to step S8 in FIG. 3.

By this processing, the right eye image data, that reproduces natural color saturation corresponding to the perspective of the object, is generated. And based on this data, a more natural three-dimensional image is generated.

[Gradation Processing]

Figure 14:
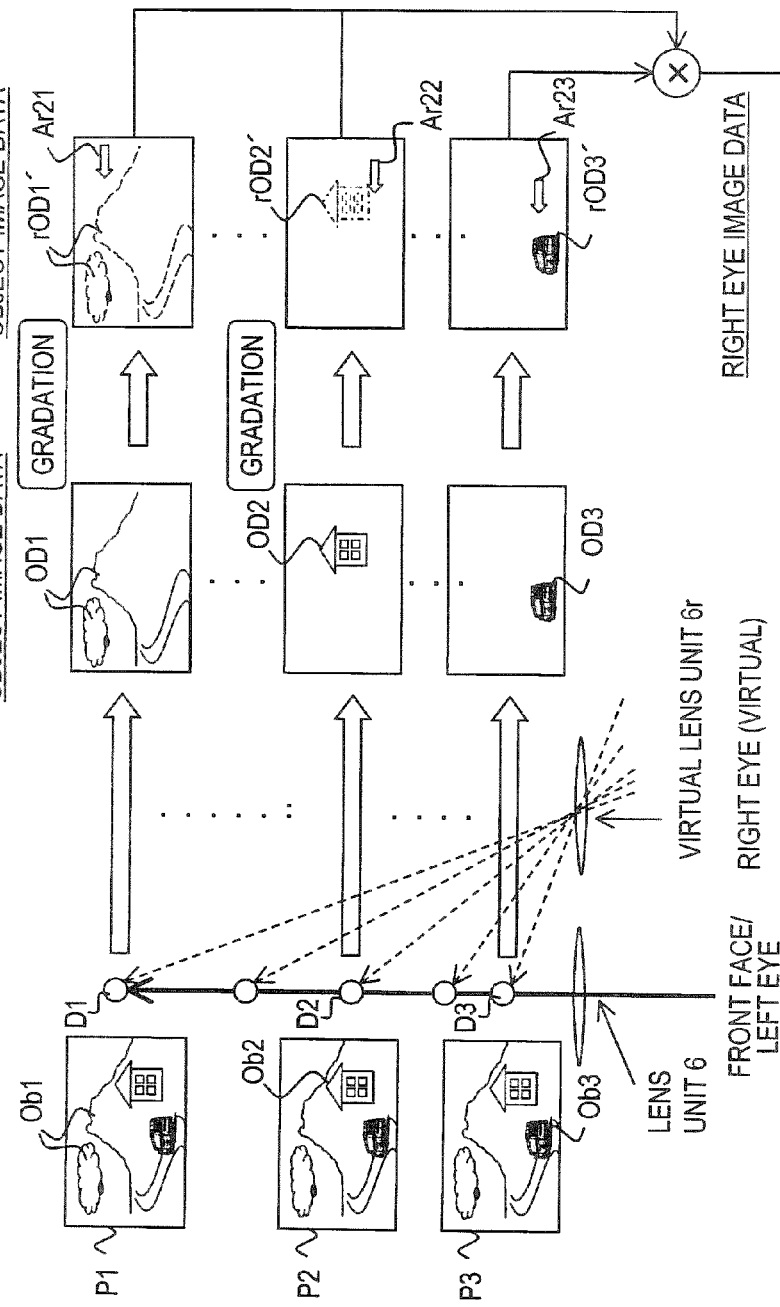
FIG. 14A-14C illustrate a gradation processing.

FIG. 14 is a diagram illustrating the gradation processing. Here the captured image data P1 to P3, illustrated in FIG. 2, will be described as an example. The first image processing unit 42a detects the focused object portions Ob1 to Ob3 from the captured images P1 to P3 (FIG. 14A), and extracts the focused object image data OD1 to OD3 (FIG. 14B). Then the second image processing unit 42b executes the gradation processing on the focused object image data OD1 to OD3 respectively, with a degree according to the corresponding focused object distances D1 to D3. In gradation processing, filter processing for removing high frequency components of the object image using a moving average filter, low pass filter based on a convolution operation, a Gaussian filter or the like, is performed. The degree of gradation processing corresponds to the quantity of the remaining high frequency components. For example, if filtering to decrease the quantity of high frequency components is performed, a strong degree of gradation processing, with which the contours of the obtained images is unclear, is executed. If filtering to increase the quantity of high frequency components is performed, a weak degree of gradation processing, with which the contours of the obtained image is somewhat clear, is executed.

As FIG. 14C illustrates, the second image processing unit 42b performs a strong degree of gradation processing on the focused object image data OD1 corresponding to the longest focused object distance D1, for example, and shifts the focused object image data OD1 by the parallax amount (arrow Ar21) to generate the right eye object image data rOD1'. The second image processing unit 42b performs gradation processing on the focused object image data OD2 corresponding to the intermediate focused object distance D2, with a degree weaker than the gradation processing on the focused object image data OD1, shifts the focused object image data OD2 by the parallax amount (arrow AR22) to generate the right eye object image data rOD2'. Then the second image processing unit 42b shifts the focused object image data OD3 corresponding to the shortest object distance D3 by the parallax amount (arrow Ar23) with hardly performing or without performing gradation processing, to generate the right eye object image data rOD3'. Then the second image processing unit 42b synthesizes the right eye object image data rOD1', rOD2' and rOD3', to generate the right eye image data PRm'. The second image processing unit 42b also generates the left eye image data by synthesizing the gradated focused object image data. The procedure of performing the gradation processing on the focused object image data OD1 to OD3 corresponds to step S9 in FIG. 3.

In this way, the left eye image data and right eye image data, with which contours become less clear as the object image is more distant, are generated. As a result, the left eye image data and right eye image data, which reproduce a natural perspective, are generated, and a more natural three-dimensional image is generated based on this data.

In the above mentioned first and second brightness correction processings, color saturation correction processing and gradation processing, it is also possible that an arbitrary focused object distance is specified by user operation, and the focused object image data corresponding to the specified focused object distance is maintained as specified or corrected to a given brightness, color saturation or quantity of gradation, and the rest of the focused object image is corrected to a lower brightness, color saturation or quantity of gradation. In this case, an image with a visual effect to enhance a specific object, such as a spot lighted portion, according to user taste, is generated.

[Interpolation Processing]

Figure 15:
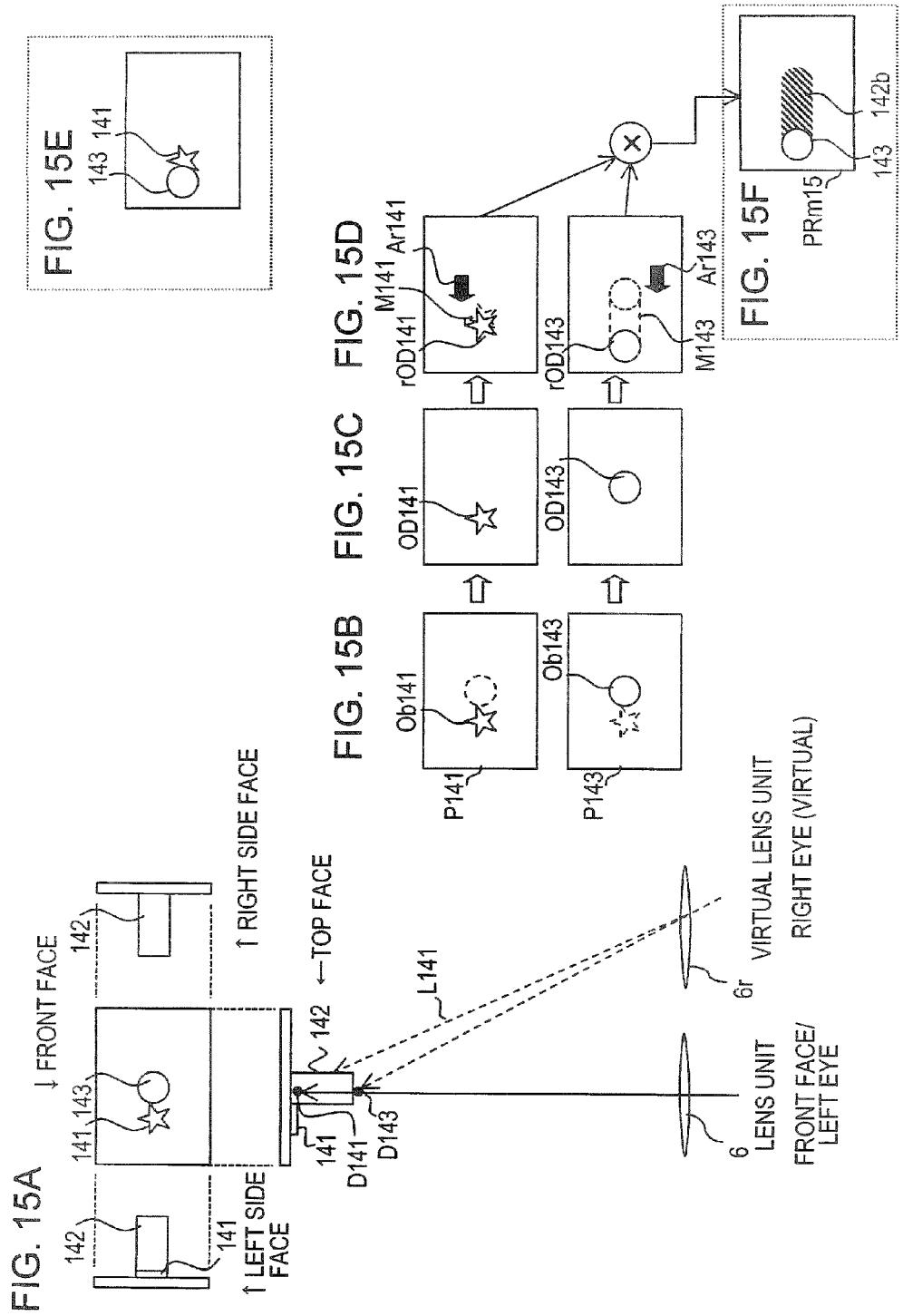
FIG. 15A-15F illustrate an interpolation processing.

FIG. 15 is a diagram illustrating an interpolation processing. FIG. 15A is a diagram illustrating a shape and a position of an object. In the upper part of FIG. 15A, four sided views of objects 141, 142 and 143 are illustrated, of which direction facing the lens unit 6 is a front. As illustrated here, a cylinder 142 protruding toward the lens unit 6 exists at the right of the object 141. The object 141 is located in the focused object distance D141, and the end portion 143 of the cylinder 142 is located in the focused object distance D143 (<D141).

As FIG. 15B illustrates, the first image processing unit 42a detects the focused object portion Ob141 corresponding to the object 141 from the captured image data P141 in the focused object distance D141, and detects the focused object portion Ob143 corresponding to the end portion 143 of the cylinder 142 from the captured image data P143 in the focused object distance D143. Here the side face of the cylinder 142, of which image is not captured from the angle of the lens unit 6 of the left eye, is not detected as a focused object portion.

Then as FIG. 15C illustrates, the first image processing unit 42a extracts the focused object image data OD141 corresponding to the focused object portion Ob141 from the captured image data P141, and extracts the focused object image data OD143 corresponding to the focused object portion Ob143 from the captured image data P143. Then as FIG. 15D illustrates, the second image processing unit 42b shifts the focused object image data OD141 and OD143 by the parallax amounts according to the corresponding focused object distances D141 and D143 (arrows Ar141, Ar143) respectively, so as to generate the right eye focused object data rOD141 and rOD143.

Here if the right eye object image data rOD141 and rOD143 are directly synthesized, a right eye image, as illustrated in FIG. 15E, is generated. In other words, the image of the object 141 is generated near the end portion 143 of the cylinder 142. However, as FIG. 15A illustrates, the side face of the cylinder 142 is observed from the virtual lens unit 6r of the right eye, due to parallax (L141), and the object 141 which is located behind the side face of the cylinder 142 is not observed. Therefore the right eye image illustrated in FIG. 15E is unnatural, since it is different from an actually observed state.

Hence according to this embodiment, when the focused object image data OD141 and OD143 are shifted by the parallax amounts, the second image processing unit 42b interpolates the intermediate regions M141 and M143 respectively between the focused object image data OD141 and OD143 before shifting and the right eye object image data rOD141 and rOD143 after shifting with a given single color, such as gray, respectively, as illustrated in FIG. 15D. The color to be used for the interpolation may be set to any color, but such an achromatic color as gray is preferably used to generate a natural three-dimensional image, minimizing the influence on the image.

Then the second image processing unit 42b synthesizes the right eye object image data rOD141 and the interpolated intermediate region M141, and the right eye object image data rOD143 and the interpolated intermediate region M143. At this time, the second image processing unit 42b renders the right eye object image data on the image memory 12 in the sequence of longer focused object distance, that is, in the sequence of the right eye object image data of which distance is longer. A region where the image data overlaps is overwritten with the right eye object image data of which focused object distance is shorter. Thereby the right eye object image data rOD141, of which focused object distance is long, and the interpolated intermediate region M141 are overwritten with the image data of the right eye object image data rOD143, of which focused object distance is short, and with the interpolated intermediate region M143. As a result, the right eye image data PRm15 illustrated in FIG. 15F is generated. Here the image 142b of the side face of the cylinder 142 is displayed with the interpolated intermediate region M143, and the object 141, which is behind the side face of the cylinder 142 and therefore may not be seen, is not displayed. In other words, an image, where an object in long distance located behind an object in a short distance is not seen, is generated. As a result, a natural right eye image data, close to the actually observed state, is generated. Based on this right eye image data, a more natural three-dimensional image is generated.

Figure 16:
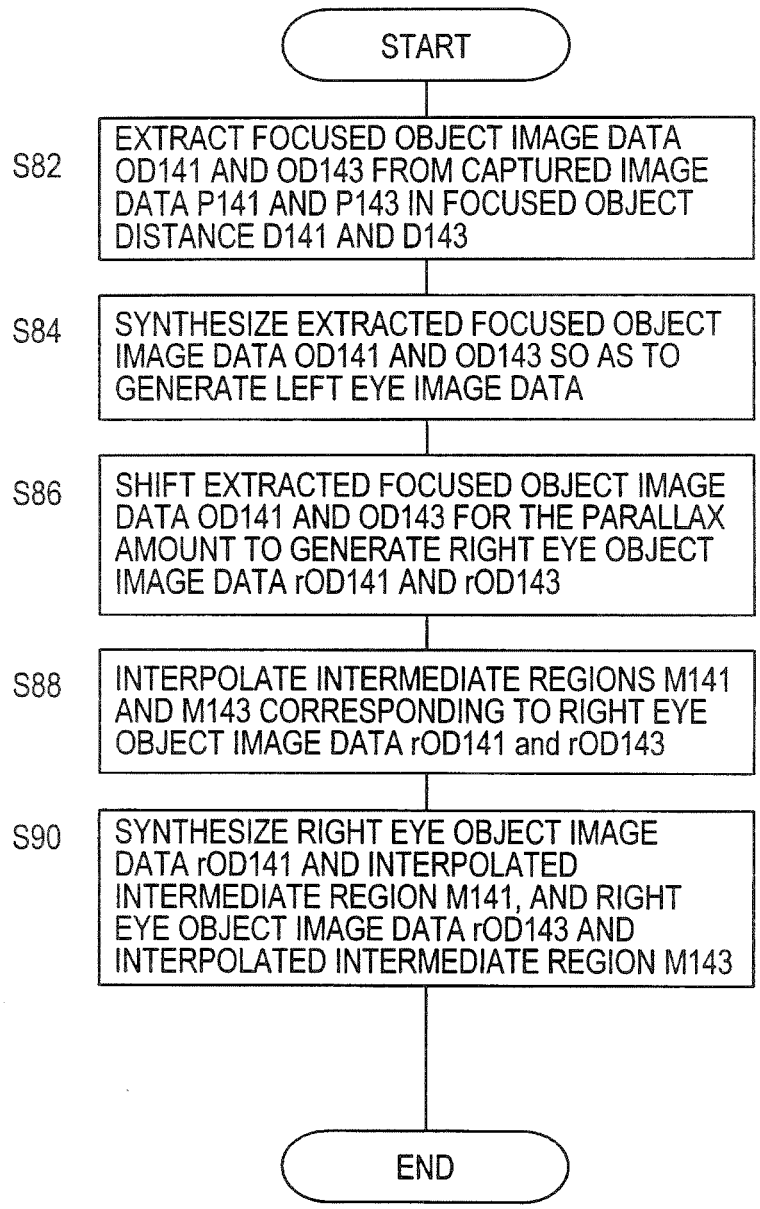
FIG. 16 illustrates an image processing procedure.

FIG. 16 is a flow chart illustrating an image processing procedure to generate a parallax image including the interpolation processing. In step S82, the first image processing unit 42a extracts the focused object image data OD141 and OD143 from the captured image data P141 and P143 in the focused object distances D141 and D143. Then in step S84, the second image processing unit 42b synthesizes the extracted focused object image data OD141 and OD143 to generate the left eye image data. Then in step S86, the second image processing unit 42b shifts the extracted focused object image data OD141 and OD143 by the parallax amounts, to generate the right eye object image data rOD141 and rOD143. Then in step S88, the second image processing unit 42b interpolates the intermediate region between the focused object image data OD141 and OD143 and the right eye object image data rOD141 and rOD143 using a single color. Then in step S90, the second image processing unit 42b synthesizes the right eye object image data rOD141 and rOD143 and the respective interpolated intermediate regions to generate the right eye image data.

Figure 17:
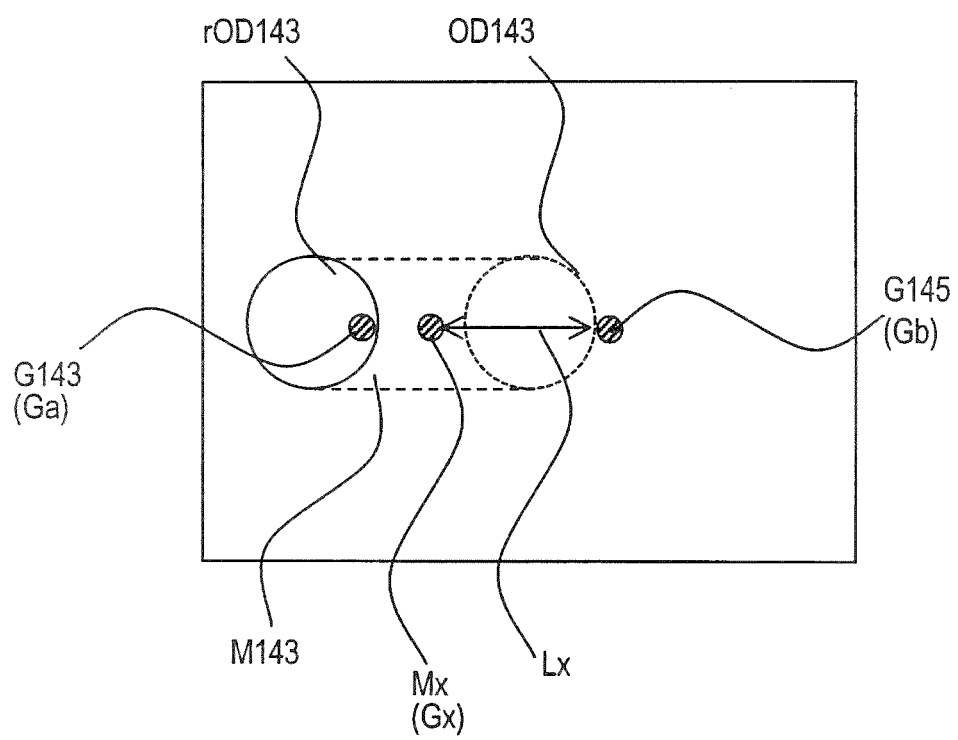
FIG. 17 illustrates a variant form of interpolation processing.

FIG. 17 is a diagram illustrating a variant form of interpolation processing. Here the right eye object image data rOD143 and interpolation target intermediate region M143, described in FIG. 15D, are illustrated. In a first variant form, the second image processing unit 42b interpolates the intermediate region M143 not with such a given color as gray, but with a color of pixel G143 (pixel value Ga) located near the intermediate region M143, that is, inside the contour line, in the right eye object image data rOD143.

In a second variant form, the second image processing unit 42b interpolates the intermediate region M143 with a color of a pixel G145 (pixel value Gb) located near the intermediate region M143 in the background region, that is, outside the contour line of the intermediate region, or outside the contour line of the focused object image data OD143 before shifting.

In a third variant form, the second image processing unit 42b interpolates the intermediate region M143 with an interpolated color of pixel G143 and pixel G145, according to the respective distances from pixel G143 and pixel G145. Specifically, when Gx is the pixel value of the interpolation target pixel Mx in the intermediate region M143, and Lx is a distance of the pixel Mx from the pixel G145, the pixel value Gx is determined based on the following expression.

$$Gx=(Ga-Gb)/Lx+Gb$$

(where Lx is a distance between pixel G143 and G145 or less).

Thereby the intermediate region M143 is interpolated using a gradation color which becomes closer to the color of the end portion 143 according to the distance to the lens unit 6, based on the color in the background region of the cylinder 142 as a reference. In the above expression, Ga and Gb may be switched, so as to use the color in the end portion 143 as a reference. According to the third variant form, an even more natural three-dimensional image is generated, than the case of interpolating using a single color.

As described above, according to the present embodiment, throughput is improved and a natural three-dimensional image is generated when an image is captured using a single lens image capturing unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A processor, comprising:
    a first image processing unit which extracts, from each of a plurality of captured image data respectively captured with different focused object distances, a plurality of focused object image data which includes image data of the focused object included in each of the plurality of captured image data but does not include image data of unfocused object therein, in accordance with each of the different focused object distances; and
    a second image processing unit which
        generates a plurality of corrected object image data by correcting brightness of the extracted plurality of focused object image data so that a brightness of the focused object image data corresponding to a first focused object distance becomes smaller than a brightness of the focused object image data corresponding to a second focused object distance that is shorter than the first focused object distance;
        generates a plurality of shifted corrected object image data by shifting a position of an object of the plurality of corrected object image data by parallax amounts corresponding to the respective focused object distances; and
        generates different eye image data with a different eye from an eye of the captured image data by synthesizing the plurality of shifted corrected object image data according to shifted positions of the shifted corrected objects.

2. The processor according to claim 1, wherein the second image processing unit, when correcting the brightness of the a plurality of focused object image data, corrects the brightness of the a plurality of focused object image data into a brightness of object image data in each corresponding region in a reference captured image data which is selected among the plurality of captured image data, and the corresponding region in the reference captured image data corresponds to a region of the focused object of the focused object image data.

3. The processor according to claim 1, wherein
the second image processing unit performs gradation processing so that the focused object image data corresponding to a first focused object distance has a first quantity of high frequency components, and the focused object image data corresponding to a second focused object distance which is shorter than the first focused object distance, has a second quantity of high frequency components which is higher than the first quantity.

4. The processor according to claim 2, wherein
the second image processing unit performs gradation processing so that the focused object image data corresponding to a first focused object distance has a first quantity of high frequency components, and the focused object image data corresponding to a second focused object distance which is shorter than the first focused object distance, has a second quantity of high frequency components which is higher than the first quantity.

* * * * *